J. HAYNES.
WHEEL RIM FOR PNEUMATIC TIRES.
APPLICATION FILED NOV. 5, 1909.
944,964.
Patented Dec. 28, 1909.
2 SHEETS—SHEET 2.
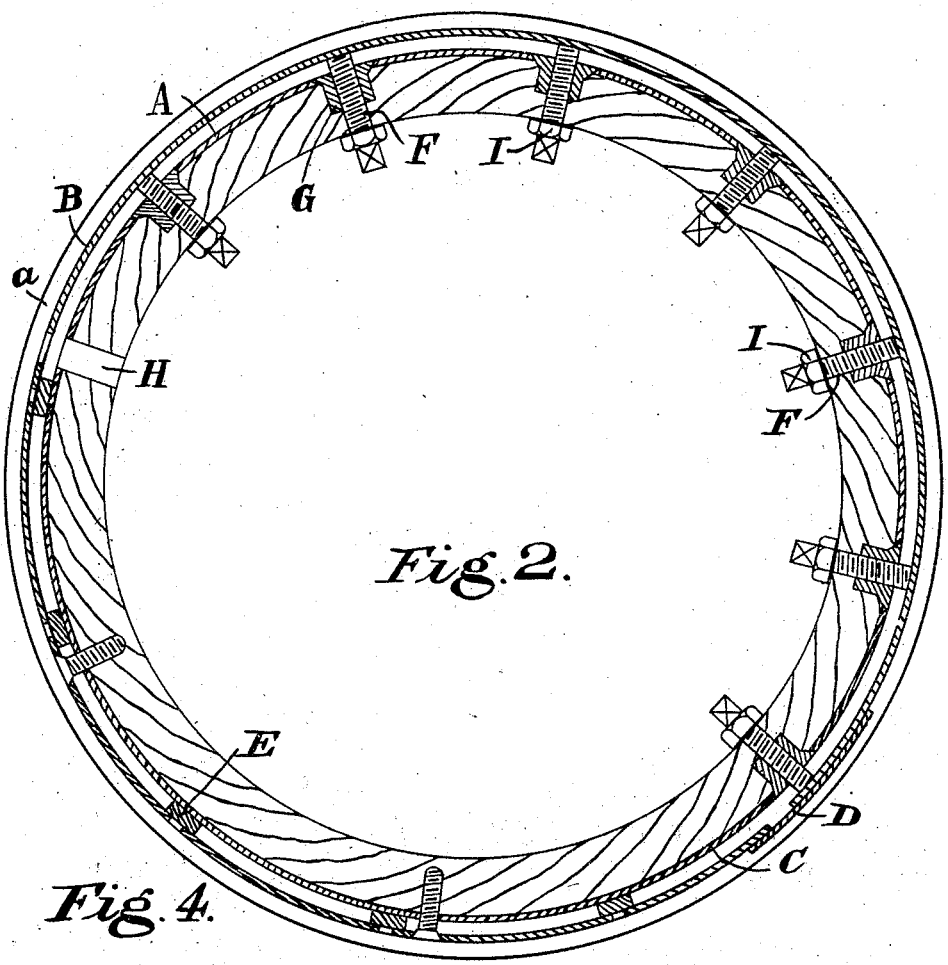
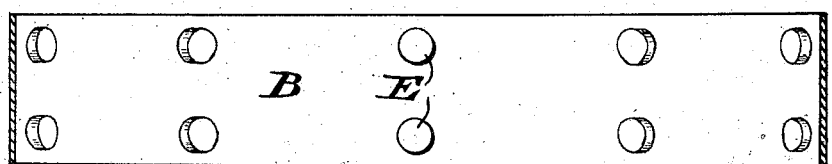
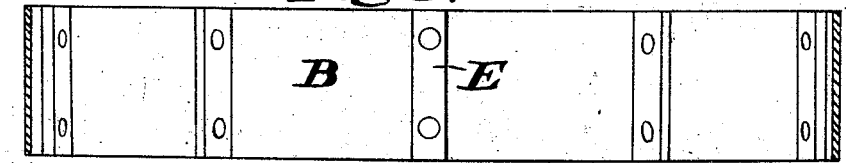

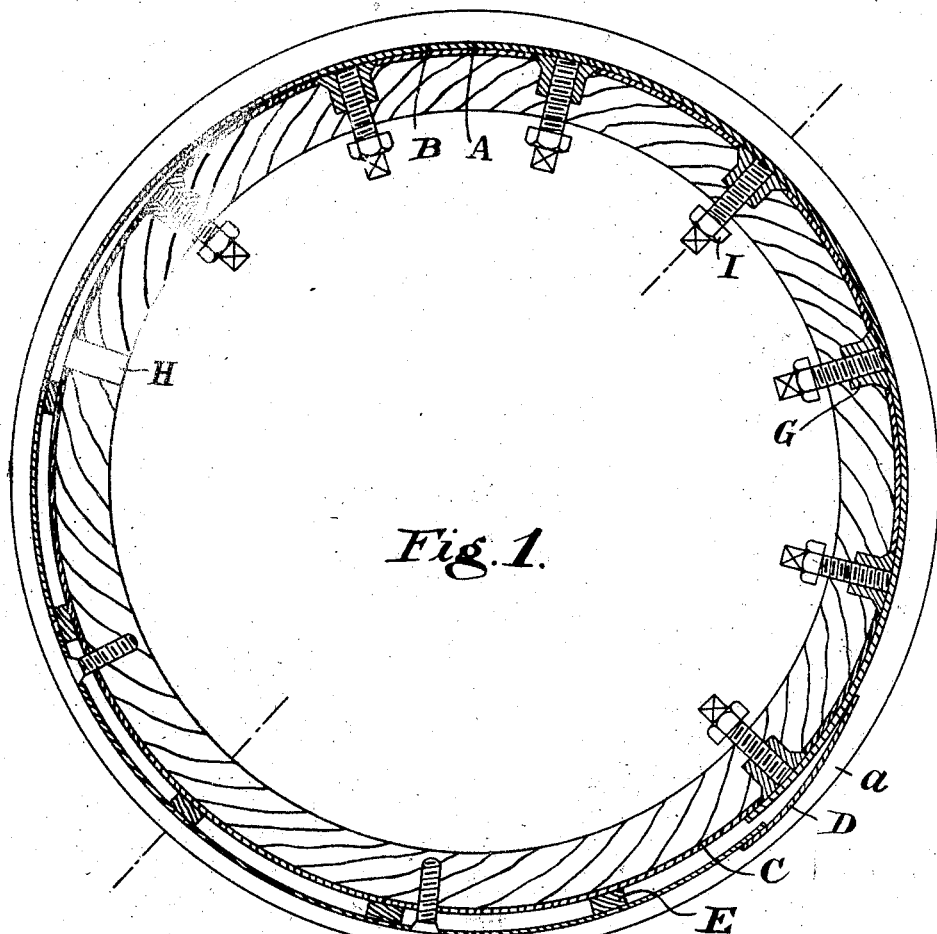
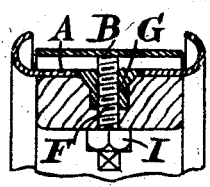
Fig. 6.
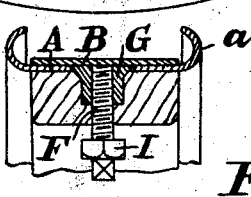
Fig. 3.
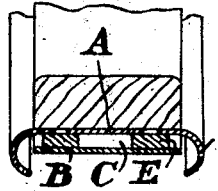

UNITED STATES PATENT OFFICE.

JOHN HAYNES, OF MANCHESTER, ENGLAND, ASSIGNOR TO CHARLES ARTHUR BRADSHAW AND WILLIAM EDWARD CUTHBERTSON, BOTH OF MANCHESTER, ENGLAND, AND THOMAS SWINBORNE SHELDRAKE, OF ILFORD, ENGLAND.

WHEEL-RIM FOR PNEUMATIC TIRES.

944,964.  Specification of Letters Patent.  Patented Dec. 28, 1909.

Application filed November 5, 1909. Serial No. 526,400.

*To all whom it may concern:*

Be it known that I, JOHN HAYNES, a subject of the King of Great Britain, residing at Manchester, in the county of Lancaster, in the Kingdom of England, have invented certain new and useful Improvements in Wheel-Rims for Pneumatic Tires, of which the following is a specification.

This invention relates to certain improvements in wheel rims for pneumatic tires, and has for its object to enable the tire to be more quickly withdrawn, repaired and then placed in position, and to lock the tire in the rim and prevent its creeping. Also to enable a tire having inextensible wired or beaded edges to be placed on any existing form of rim.

The invention will be understood from the following description, reference being had to the accompanying drawings, in which:—

Figure 1 is a sectional view of the felly and rim portion of a wheel showing the locking ring contracted; Fig. 2, a similar view, showing the ring expanded; Fig. 3, a fragmentary cross sectional view of Fig. 1; Fig. 4, a sectional plan view of the ring; and Fig. 5, the same, showing a slight modification; Fig. 6, a cross section of Fig. 2.

In carrying the invention into effect, I form the rim A, which is fixed to the felly, of any suitable shape with side flanges $a$. Inside the rim and between the flanges $a$ I place a ring B, of larger diameter than the bed of the rim A, so as to leave an annular space C between it and the rim A. This ring B, which is split at one place D, is for half its circumference fixed about mid-way between the bed of the rim A, and the top of its flanges $a$ by screws and spacing blocks E, while for the other half it is not so fixed, but coupled to or pressing against it, are a number of screwed pins F, and these pins F pass through the rim at intervals, and through nuts or screwed bushings G, so as to support the split ring B, and expand or contract it as required. By turning these pins F therefore one way, one half of the split ring B is forced outward so as to lie concentric with the bed of the rim A and with the other half of the ring B, as shown in Fig. 2, or if turned the other way, the ring B collapses inward against or toward the bed of the rim A as shown in Figs. 1 and 3, and thus one-half of the said split ring is eccentric with the rim, while the other half remains concentric. The joint D in the split ring comes where the fixed portion ends, and the movable portion begins, and the valve enters about opposite the joint viz. at H.

The mode of action is as follows:—To place the tire in position, the lock nuts I and screws F are slackened, so that the half circumference of the split ring B, contracts and lies eccentric with the rim A. The air tube uninflated, and the outer cover are slipped over the flanges at the valve hole H. The tire is then worked over the flanges $a$ all around, and slips quite easily over the last few inches, generally the hardest part in placing a tire on a rim. The screwed pins F are then tightened up, and locked by the nuts I, until the half circumference of the split ring B is forced out or expanded against the tire, and assumes a circular shape, that is, it is brought into concentricity with the fixed part of the ring B, and compels the inextensible wired or beaded edges of the outer cover to assume a similar configuration. The tire is now inflated in the usual manner. It is impossible for the tire to creep, when either inflated or deflated. When the screwed pins F are turned back again, the springy nature of the split ring B enables it to contract against the felly rim A, and lie below the periphery of the remaining part of the ring B. The removal of the tire is thus facilitated.

An important feature of this invention is, that in the event of the tires with inextensible wired or beaded edges being so badly damaged as to necessitate a new tire being placed on the rim, and it being impossible to obtain a similar tire at the moment, (as may happen in country districts), by taking out the two "anchoring" or holding screws the whole band may be removed from the felly rim A, leaving a plain rim upon which an ordinary tire can be placed in the usual manner. In other words, an ordinary beaded rim to which this band has been applied, can at any moment be reconverted into an ordinary rim, and used as such.

Fig. 4 shows the spacing blocks E made circular, in Fig. 5 they are made in the form of bars.

I declare that what I claim is:—

1. In a vehicle wheel the combination of a rim having curved inwardly projecting flanges, a flexible split ring located within said rim and extending substantially around the same, devices for connecting a portion of said ring to said rim, whereby it is held in fixed relation thereto, and adjustable devices bearing against the under side of the remainder of said ring whereby the position of the same relative to the flanges may be adjusted.

2. In a vehicle wheel the combination of a rim, having curved inwardly projecting flanges, a flexible split ring located within said rim and extending substantially around the same, spacing blocks interposed between said ring, and said rim throughout substantially one half of said ring, screws for holding said ring against said spacing blocks and adjustable screws bearing against the underside of the other half of said ring, whereby the position of the same relative to the flanges may be adjusted.

In witness whereof, I have hereunto signed my name this 26th day of October 1909, in the presence of two subscribing witnesses.

JOHN HAYNES.

Witnesses:
SAM NORTON SMITH.
FREDERICK VALLIS HOPKINS.